United States Patent
Litwin et al.

(10) Patent No.: US 7,684,472 B2
(45) Date of Patent: Mar. 23, 2010

(54) METHOD AND APPARATUS FOR FREQUENCY-ROBUST DETECTION OF A WIDEBAND CODE DIVISION MULTIPLE ACCESS SECONDARY SYNCHRONIZATION CHANNEL

(75) Inventors: Louis Robert Litwin, Plainsboro, NJ (US); Alton Shelborne Keel, Melbourne, FL (US); Wen Gao, Plainsboro, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 521 days.

(21) Appl. No.: 10/612,310

(22) Filed: Jul. 2, 2003

(65) Prior Publication Data

US 2005/0002446 A1    Jan. 6, 2005

(51) Int. Cl.
*H04B 1/69* (2006.01)
(52) U.S. Cl. .................. 375/150; 375/142; 375/152; 375/316; 375/344; 375/132; 370/527; 370/331; 370/337; 370/335; 370/320; 455/422.1; 455/161.1; 455/423; 455/502
(58) Field of Classification Search ............. 375/140, 375/147, 149, 150, 152, 316, 340, 343, 344, 375/348, 349, 322, 324, 325, 346, 377, 142, 375/132; 370/479, 331, 503, 527, 337, 320, 370/335; 379/355.07; 340/572.2; 329/304; 455/422.1, 161, 161.1, 502, 423
See application file for complete search history.

(56) References Cited

U.S. PATENT DOCUMENTS

| | | | | |
|---|---|---|---|---|
| 5,414,729 A * | 5/1995 | Fenton | .................. | 375/149 |
| 5,774,494 A * | 6/1998 | Sawahashi et al. | .......... | 375/152 |
| 6,266,365 B1 * | 7/2001 | Wang et al. | .................. | 375/150 |
| 6,298,227 B1 * | 10/2001 | Molnar | ................... | 455/323 |
| 6,526,091 B1 * | 2/2003 | Nystrom et al. | ............. | 375/142 |
| 6,567,482 B1 * | 5/2003 | Popovic' | ................... | 375/343 |
| 7,013,135 B2 * | 3/2006 | Hiramatsu | ................... | 455/423 |
| 7,039,036 B1 * | 5/2006 | Dabak et al. | ................ | 370/342 |
| 7,315,600 B2 * | 1/2008 | Sigurdsson et al. | ......... | 375/372 |
| 2003/0202564 A1 * | 10/2003 | Ho et al. | ..................... | 375/147 |
| 2003/0231705 A1 * | 12/2003 | Lewis | .......................... | 375/150 |
| 2005/0163266 A1 * | 7/2005 | Demir | .......................... | 375/344 |
| 2005/0220239 A1 * | 10/2005 | Sigurdsson et al. | ......... | 375/372 |

* cited by examiner

*Primary Examiner*—Chieh M Fan
*Assistant Examiner*—Eva Y Puente
(74) *Attorney, Agent, or Firm*—Robert D. Shedd; Vincent E. Duffy; Michael A. Pugel

(57) ABSTRACT

The disclosed embodiments may relate to a method and apparatus for performing a correlation with respect to a received signal. A first correlator may correlate for a real part of a first characteristic of the received signal to produce a first real correlated signal. A second correlator may correlate for an imaginary part of the first characteristic of the received signal to produce a first imaginary correlated signal. A third correlator may correlate for a real part of a second characteristic of the received signal to produce a second real correlated signal. A fourth correlator may correlate for an imaginary part of the second characteristic of the received signal to produce a second imaginary correlated signal. Logic may combine a signal that corresponds to the first real correlated signal, a signal that corresponds to the first imaginary correlated signal, the second real correlated signal and the second imaginary correlated signal to produce a real part of a frequency adjusted signal and an imaginary part of the frequency adjusted signal.

20 Claims, 4 Drawing Sheets

METHOD AND APPARATUS FOR FREQUENCY-ROBUST DETECTION OF A WIDEBAND CODE DIVISION MULTIPLE ACCESS SECONDARY SYNCHRONIZATION CHANNEL

FIELD OF THE INVENTION

The present invention relates to processing of received code division multiple access ("CDMA") signals.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Manufacturers of wireless communication devices have a wide range of transmission technologies to choose from when designing wireless systems. Some exemplary technologies include time division multiple access ("TDMA"), code division multiple access and the like. CDMA, which is typically implemented using direct sequence spread spectrum technology, is very popular in communications systems, including cellular telephones and the like.

In a CDMA system, a code or symbol is assigned to all speech bits in a voice signal. The symbols are encoded across a frequency spectrum and transmitted to a receiver. When the encoded CDMA symbols are received, they are decoded and reassembled into a signal representative of the original voice signal.

In processing received CDMA signals, it may be difficult to detect long symbols in the presence of a frequency offset. Because the chips (each chip is equal to one bit in a spreading code) that make up a symbol may tend to rotate in the presence of a frequency offset, it is possible for the chips to rotate completely around the complex plane during the integration period of one symbol. When this happens, the chips may destructively combine to produce a very small correlation peak. One method may be to solve this problem may be to implement a frequency synchronization block in hardware, but such solutions may be undesirably expensive in order to be able to tolerate higher frequency offsets. Absent more expensive hardware solutions, a receiver may only be able to detect long symbols in the presence of relatively low frequency offsets. An improved method and apparatus for the detection of long symbols in the presence of a relatively high frequency offset is desirable.

SUMMARY OF THE INVENTION

The disclosed embodiments may relate to a method and apparatus for performing a correlation with respect to a received signal. A first correlator may correlate for a real part of a first characteristic of the received signal to produce a first real correlated signal. A second correlator may correlate for an imaginary part of the first characteristic of the received signal to produce a first imaginary correlated signal. A third correlator may correlate for a real part of a second characteristic of the received signal to produce a second real correlated signal. A fourth correlator may correlate for an imaginary part of the second characteristic of the received signal to produce a second imaginary correlated signal. Logic may combine a signal that corresponds to the first real correlated signal, a signal that corresponds to the first imaginary correlated signal, the second real correlated signal and the second imaginary correlated signal to produce a real part of a frequency adjusted signal and an imaginary part of the frequency adjusted signal.

BRIEF DESCRIPTION OF THE DRAWINGS

In the drawings:

FIG. 2, which comprises

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
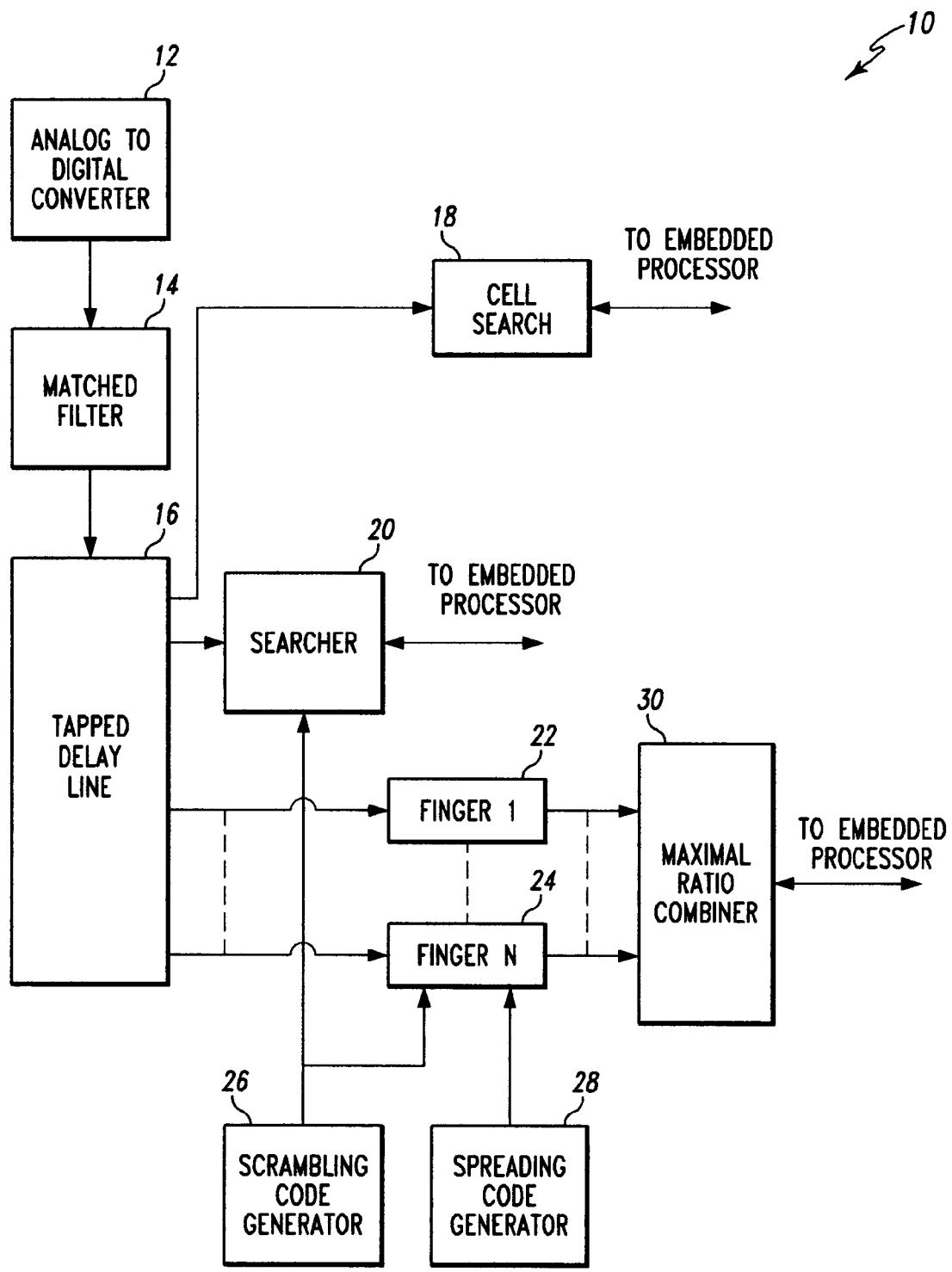
FIG. 1 is a block diagram of an exemplary CDMA receiver in which embodiments of the present invention may be employed.

FIG. 1 is a block diagram of an exemplary CDMA receiver in which embodiments of the present invention may be employed. The CDMA receiver is generally referred to by the reference numeral 10. After an analog CDMA signal is received, it is converted to a digital signal by an analog-to-digital converter 12. The digital output of the analog-to-digital converter 12 is delivered to a matched filter 14. The matched filter 14 produces a signal that matches the shape of the transmitted signal.

The output of the matched filter 14 is delivered to a tapped delay line 16, which provides output to various receiver components. The various taps of the tapped delay line 16 may be adjusted to synchronize the operation of the CDMA receiver 10.

One output from the tapped delay line 16 is delivered to a cell search block 18. The cell search block may be implemented in receivers that comply with third generation ("3G") wireless communication standards such as the Universal Mobile Telecommunications System ("UMTS") Wideband Code Division Multiple Access ("WCDMA") standard, which is hereby incorporated by reference, to synchronize a mobile terminal such as a cellular telephone with a base station. The cell search block 18 may perform synchronization when a user's phone is first turned on or when synchronization with the base station is lost (for example, after going through a tunnel).

In the UMTS WCDMA standard, both the Primary Synchronization Channel ("SCH") and Common Pilot Channel ("CPICH") have a length of 256 chips. The Primary SCH channel is a sparse channel and it only contains data during the first 256 chips of each 2560 chip slot. The same data is repeated for every slot in the frame and all frames carry the same Primary SCH channel. In addition, all cells in a WCDMA system transmit identical Primary SCH channels. Once the Primary SCH channel is acquired by a mobile terminal, the receiver will have achieved chip, symbol and slot synchronization. However, since the Primary SCH contains the same data in every slot, it cannot be used to achieve frame synchronization because all slots in a frame are identical and hence they cannot be used to determine the location of the frame start.

The sign of the data on the SCH channel (both Primary and Secondary SCH) is used to indicate to the mobile terminal whether or not space-time transmit diversity ("STTD") encoding is being used on the downlink Primary Common Control Physical Channel ("P-CCPCH"). The polarity of the SCH channel does not affect the cell search process since the algorithms only process the magnitude of the correlations of the signal.

The signal transmitted on the Primary SCH channel is called the Primary Synchronization Code ("PSC") and it is constructed from a hierarchical Golay sequence. This sequence was chosen because it has good aperiodic autocorrelation properties. Another desirable feature of the sequence is that a low-complexity matched filter can be used to process it. The reduced complexity of the matched filter is possible because of the hierarchical nature of the sequence.

The Secondary SCH channel is different for every cell in a UMTS system and its purpose is to aid the receiver in obtaining frame synchronization as well as knowledge of the scrambling code group used in the current cell. Like the Primary SCH channel, the Secondary SCH channel is also only transmitted during the first 256 chips of each slot. Each slot of a frame contains a Secondary Synchronization Code ("SSC"). There are a total of 16 possible SSCs. These SSCs are complex-valued and they are based on Hadamard sequences.

The CPICH is a continuous downlink pilot signal that contains a known training sequence scrambled by the current cell's scrambling code. The training sequence used is a constant 1+j. Unlike the SCH channel, the CPICH is a continuous signal that is transmitted for the entire duration of each frame. Once the correct scrambling code group is determined, the receiver can correlate against the CPICH using each of the eight different scrambling codes in a given code group in order to find the correct scrambling code for the current cell.

The cell search block 18 performs at least two functions. First, it acquires the Primary SCH channel to achieve slot synchronization. A UMTS frame (with duration of 10 ms) consists of 38400 chips. The frame is made up of 15 slots, each of 2560 chips in length. After the cell search block 18 acquires slot synchronization, the CDMA receiver 10 has knowledge of slot boundaries, but it still does not know when frames start. Second, the cell search block 18 then acquires the Secondary SCH channel in order to achieve frame synchronization.

Simultaneously, the acquisition of the Secondary SCH channel uniquely determines which downlink scrambling code group is being transmitted. Each code group contains eight possible scrambling codes and the block correlates against each one to determine which one has the highest peak (and hence the most likelihood of being transmitted). Once determined, other blocks in the CDMA receiver 10 can tune to the base station by using this scrambling code. The identification of the Secondary SCH channel by the cell search block 18 is described in greater detail below with reference to FIGS. 2 and 3.

The tapped delay line 16 delivers a second output to a searcher block 20. A scrambling code generator 26 also delivers a signal to the searcher block 20. The searcher block 20 correlates the received samples against different delayed versions of the scrambling code. By monitoring the correlation outputs at different offsets of the scrambling code, the block searches for peaks which represent multipath signals on which the receiver can receive data.

A plurality of 1-N finger circuits 22, 24 may be included in the CDMA receiver 10. The finger circuits 22, 24 may receive input from the tapped delay line 16, the scrambling code generator 26 and a spreading code generator 28. In a spread-spectrum CDMA system such as required by UMTS, data bits are used to modulate spreading codes of different lengths. If a bit is modulated onto a spreading code of length 256, the data rate will be low (because it takes 256 chips to send a bit) but the processing gain will be high (because of the correlation gain from correlating against a sequence of length 256). If a bit is modulated onto a spreading code of length four, the data rate will be high (because a bit can be sent every four chips) but the processing gain will be low (since there is not much correlation gain from correlating against a short four-chip sequence).

Each of the finger circuits 22, 24 may be dropped onto a peak found by the searcher block 20. Each of the finger circuits 22, 24 may contain a correlator that correlates the received samples against the scrambling code delayed by a given amount. The finger circuits 22, 24 may despread the data.

The output of the finger circuits 22, 24 is delivered to a maximal ratio combiner ("MRC") 30. The MRC 30 takes the samples from each finger (which corresponds to different multipath versions of the same downlink transmitted signal), rotates them by their pilots to align the phase of the signals and adds them together to form the estimate of the transmitted symbols that will be processed by the CDMA receiver 10.

The outputs of the cell search block 18, the searcher block 20 and the MRC 30 may be delivered to an embedded processor (not shown) for further processing. As set forth above, FIG. 2 further illustrates the operation of the cell search block 18 to correlate the Secondary SCH channel in a received WCDMA signal.

Figure 2A:
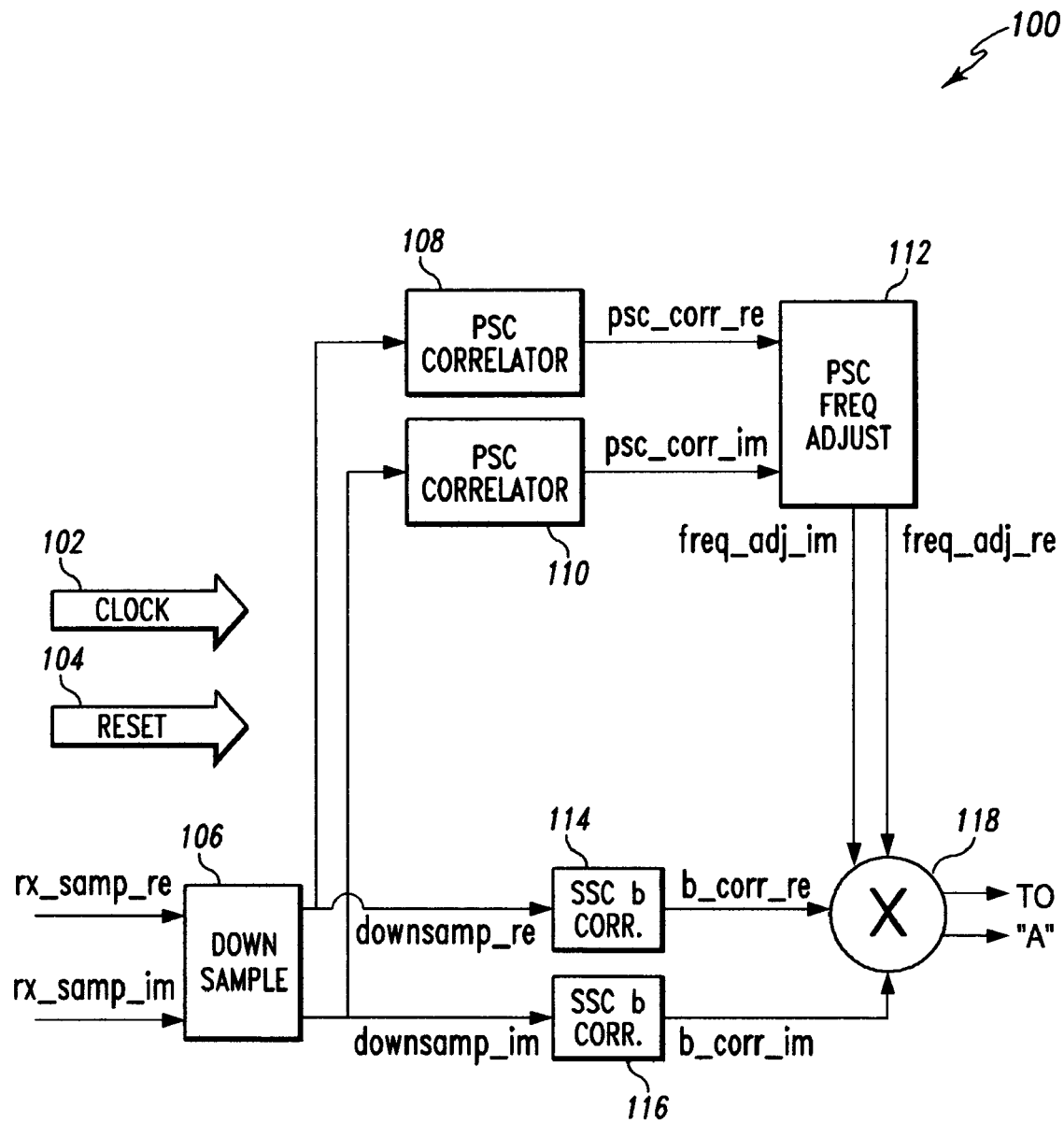
FIG. 2A and FIG. 2B, is a block diagram of a Secondary Synchronization Channel correlation block that may be employed in a cell search block according to an embodiment of the present invention.
Figure 2B:
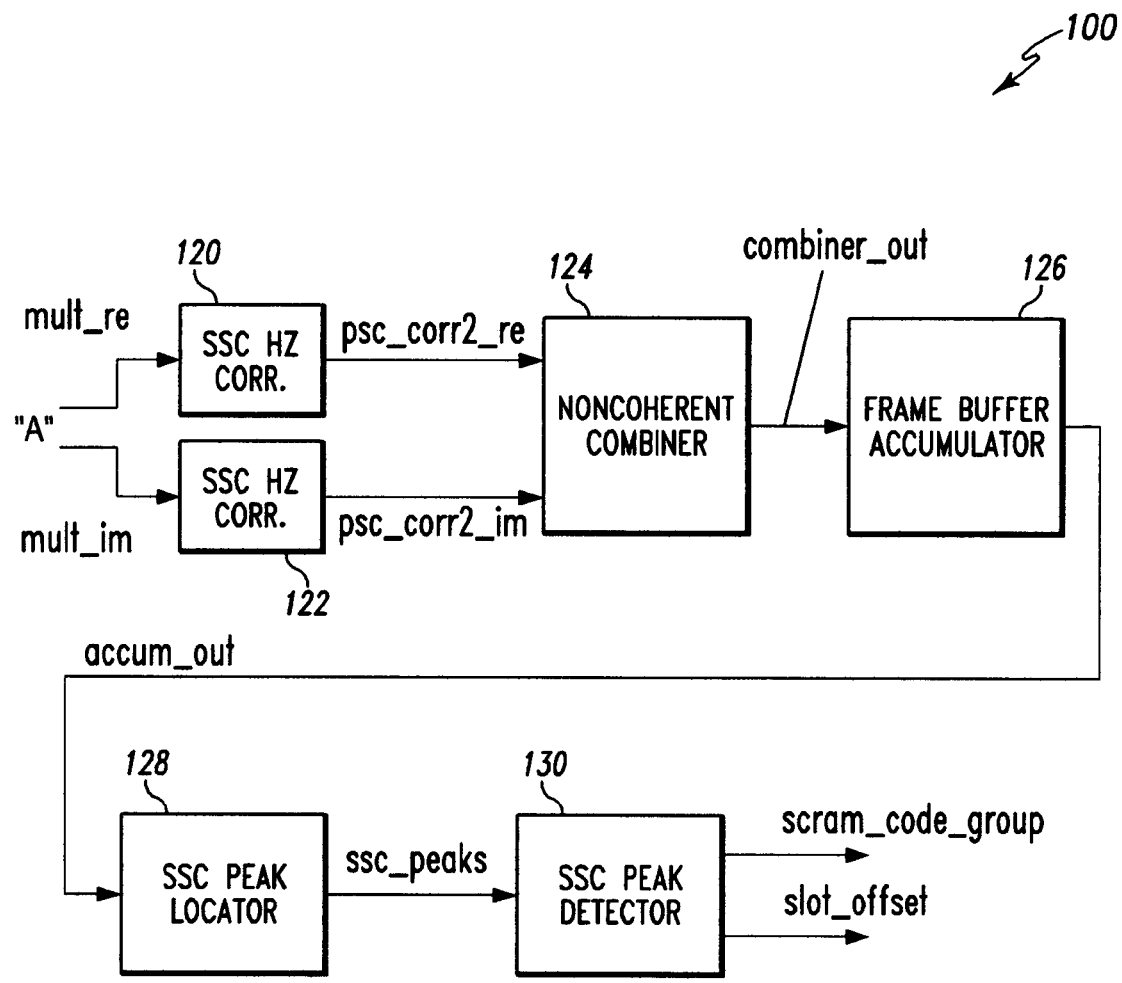

FIG. 2, which comprises FIG. 2A and FIG. 2B, is a block diagram of a Secondary SCH correlation block that may be employed in a cell search block according to an embodiment of the present invention. The Secondary SCH correlation block is generally referred to by the reference numeral 100 in both FIGS. 2A and 2B. The Secondary SCH correlation block 100 may use the output of a correlation for the Primary SCH channel to derive a frequency adjustment that is applied prior to the second stage of correlation for the Secondary SCH channel. Thus, the Secondary SCH detection algorithm may work under much higher frequency offsets than would otherwise be possible.

Beginning with FIG. 2A, the Secondary SCH correlation block 100 comprises a dock signal 102 to synchronize its operations. Also included is a reset signal 104, which may be used to reset the Secondary SCH correlation block 100, for example, upon initialization.

The Secondary SCH channel is designed as a hierarchical sequence. Reception of that channel is accomplished by first correlating against one of the hierarchical sequences. The output of that correlator is then correlated against the second hierarchical sequence. Typically, the first correlation is for the b sequence of the Secondary SCH channel (defined in the UMTS WCDMA standard), and the second correlation is for the Hz sequence (defined in the UMTS WCDMA standard).

A down sample block 106 receives a received sample (for example, from the tapped delay line 16 (FIG. 1)). The received sample may comprise a real part (rx_samp_re) and an imaginary part (rx_samp_im). The real portion (downsample_re) of the downsample block 106 is delivered to a PSC correlator 108 and a SSC b correlator 114. The imaginary portion (download_im) of the output of the downsample block 106 is delivered to a PSC correlator 110 and a SSC b correlator 116. The output of the PSC correlator 108 (psc_corr_re) and the output of the PSC correlator 110 (psc_corr_im) are delivered to a PSC frequency adjust block 112.

The output of the PSC frequency adjust block 112, which comprises a real part (freq_adj_re) and an imaginary part (freq_adj_im), is delivered to a multiplier 118. The outputs of the SSC b correlator 114 and the SSC b correlator 116 are also delivered to the multiplier 118.

The PSC correlators 108 and 110 correlate against the a sequence of the Primary SCH channel (defined in the UMTS WCDMA standard). This correlation occurs simultaneously with the operation of the SSC b correlators 114 and 116. The PSC frequency adjust block 112 computes complex-valued samples (one for every SSC b sequence correlation period) that is multiplied by the outputs of the SSC b correlators by the multiplier 118 before the output of the multiplier 118 is delivered for processing by SSC Hz correlators (see FIG. 2B). This adjustment factor rotates the samples in order to correct for the rotation due to the frequency offset.

Turning to FIG. 2B, a real part (mult_re) of output of the multiplier 118 is delivered to a SSC Hz correlator 120 and an imaginary part (mult_im) of the output of the multiplier 118 is delivered to a SSC Hz correlator 122. The output of the SSC Hz correlator 120 (psc_corr2_re) and the output of the SSC Hz correlator 122 (psc_corr2_im) are delivered to a non-coherent combiner 124. The output of the non-coherent combiner 124 (combiner_out) is delivered to a frame buffer accumulator 126.

The output of the frame buffer accumulator 126 (accum_out) is delivered to a SSC peak locator 128. The output of the SSC peak locator 128 (ssc_peaks) is delivered to a SSC peak detector 130. The SSC peak detector 130 provides a scram_code_group output and a slot_offset output, which are used for further processing.

Figure 3:
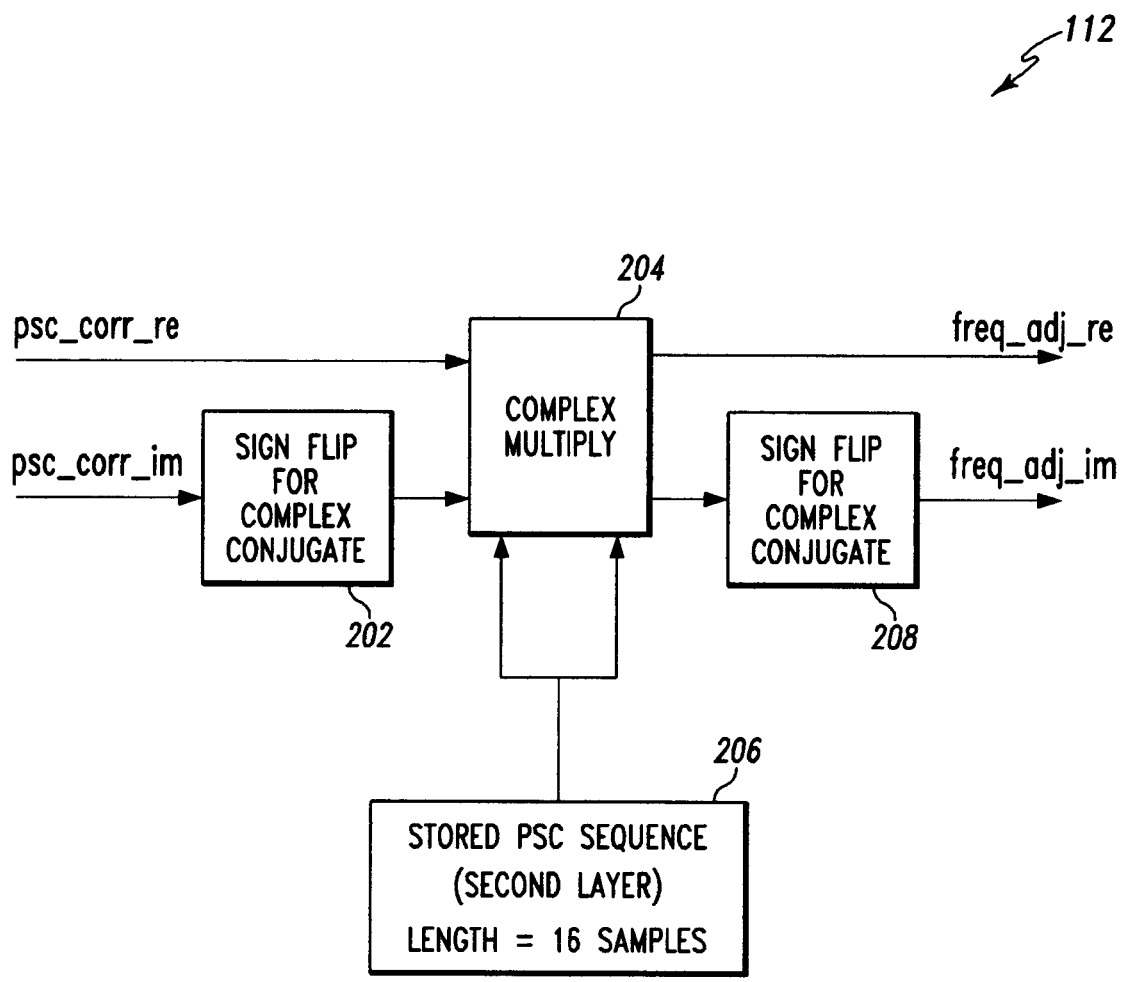
FIG. 3 is a block diagram of a primary synchronization code ("PSC") frequency adjust block in accordance with an embodiment of the present invention.

FIG. 3 is a block diagram of a PSC frequency adjust block in accordance with an embodiment of the present invention. The PSC frequency adjust block shown in FIG. 3 corresponds to the PSC frequency adjust block 112 (FIG. 2), so it is referred to by the reference numeral 112.

The PSC frequency adjust block 112 receives the psc_corr_re signal from the PSC correlator 108 and the psc_corr_im signal from the PSC correlator 110. The psc_corr_re signal is delivered to a complex multiply block 204. The psc_corr_im signal is delivered to a sign flip block 202, which determines the complex conjugate of the psc_corr_im signal. The output of the sign flip block 202 is delivered to the complex multiply block 204. The complex multiply block 204 multiplies the received signals by a stored second layer of the PSC sequence 206. That stored sequence may comprise 16 samples, as shown in FIG. 3. The real output of the complex multiply block 204 corresponds to the freq_adj_re signal shown in FIG. 2A. An imaginary part of the output of the complex multiply block 204 is delivered to a sign flip block 208, which takes its complex conjugate. The output of the sign flip block 208 corresponds to the freq_adj_im signal shown in FIG. 2A.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A cell search block, the cell search block comprising:
   a first correlation arrangement that correlates for a primary synchronization code in a received signal to produce a first correlated signal;
   a second correlation arrangement that correlates for a secondary synchronization code in the received signal to produce a second correlated signal, the secondary synchronization code being different than the primary synchronization code; and
   logic that derives a frequency adjustment signal from the first correlated signal and combines the frequency adjustment signal with the second correlated signal to reduce a frequency offset in the second correlated signal such that a secondary synchronization channel of a cell is acquired in the cell search block.

2. The cell search block set forth in claim 1, further comprising:
   a frequency adjustment block that receives the first correlated signal and produces the frequency adjustment signal.

3. The cell search block set forth in claim 2, wherein the frequency adjustment block comprises a primary synchronization code ("PSC") frequency adjustment block.

4. The cell search block set forth in claim 1, wherein the first correlation arrangement includes primary synchronization code ("PSC") correlators.

5. The cell search block set forth in claim 1, wherein the secondary correlation arrangement includes secondary synchronization code ("SSC") b correlators.

6. The cell search block set forth in claim 1, wherein the primary synchronization code corresponds to an a sequence of a Primary SCH channel.

7. The cell search block set forth in claim 1, wherein the secondary synchronization code corresponds to a b sequence of a Secondary SCH channel.

8. The cell search block set forth in claim 1, wherein the cell search block comprises a portion of a code division multiple access receiver.

9. The cell search block set forth in claim 1, wherein the cell search block comprises a portion of a receiver that complies with the Universal Mobile Telecommunications System ("UMTS") Wideband Code Division Multiple Access ("WCDMA") standard.

10. A code division multiple access ("CDMA") receiver that receives a CDMA signal, the CDMA receiver comprising:
   an analog-to-digital converter that receives a CDMA signal and converts the CDMA signal into a digital signal:
   a matched filter that filters the digital signal to produce a filtered digital signal;
   a tapped delay line that receives the filtered digital signal and produces a delayed filtered digital signal; and
   a cell search block, comprising:
      a first correlation arrangement that correlates at least a portion of the delayed filtered digital signal for a primary synchronization code in the received signal to produce a first correlated signal;
      a second correlation arrangement that correlates at least a portion of the delayed filtered digital signal for a secondary synchronization code in the received signal to produce a second correlated signal; and logic that derives a frequency adjustment signal from the first correlated signal and combines the frequency adjustment signal with the second correlated signal to reduce a frequency offset in the second correlated signal such that a secondary synchronization channel of a cell is acquired.

11. The CDMA receiver set forth in claim 10, further comprising:

a frequency adjustment block that receives the first correlated signal and produces the frequency adjustment signal.

12. The CDMA receiver set forth in claim 11, wherein the frequency adjustment block comprises a primary synchronization code ("PSC") frequency adjustment block.

13. The CDMA receiver set forth in claim 10, wherein the first correlation arrangement includes primary synchronization code ("PSC") correlators.

14. The CDMA receiver set forth in claim 10, wherein the second correlation arrangement includes secondary synchronization code ("SSC") b correlators.

15. A method of performing a cell search, comprising:

correlating against a primary synchronization code of a received signal to produce a first correlated signal;

correlating against a secondary synchronization code of the received signal to produce a second correlated signal, the secondary synchronization code being different than the primary synchronization code;

deriving a frequency adjustment factor from the first correlated signal; and combining the frequency adjustment factor with the second correlated signal to reduce a frequency offset in the second correlated signal such that a secondary synchronization channel of a cell is acquirable.

16. The method set forth in claim 15, wherein the primary synchronization code corresponds to an a sequence of a Primary SCH channel.

17. The method set forth in claim 15, wherein the secondary synchronization code corresponds to a b sequence of a Secondary SCH channel.

18. The method set forth in claim 15, further comprising the step of:

determining a complex conjugate of an imaginary portion of the first correlated signal.

19. The method set forth in claim 15, further comprising the step of:

multiplying the first correlated signal by a primary synchronization code sequence to derive the frequency adjustment factor.

20. The method set forth in claim 19, further comprising the step of:

determining a complex conjugate of an imaginary portion of the first correlated signal to form an imaginary portion of the frequency adjustment factor.

* * * * *